No. 666,051. Patented Jan. 15, 1901.
J. GRÜN.
TANK WAGON FOR DELIVERING FERMENTED LIQUORS.
(Application filed Apr. 24, 1900.)
(No Model.)
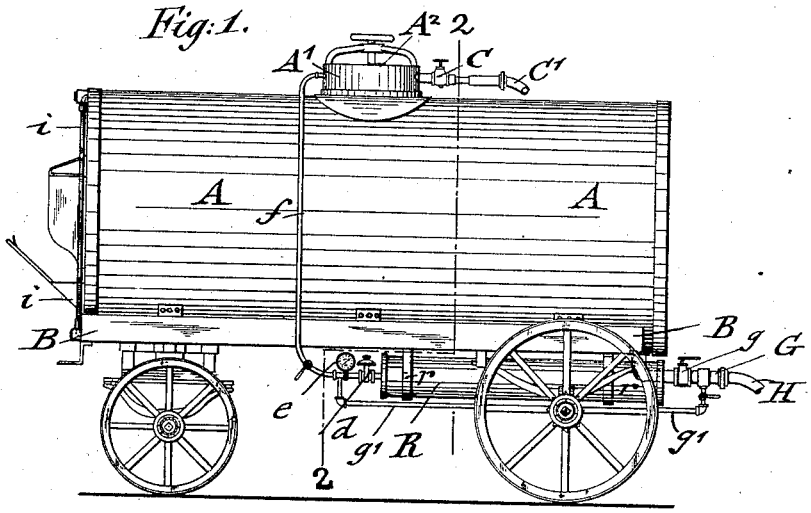
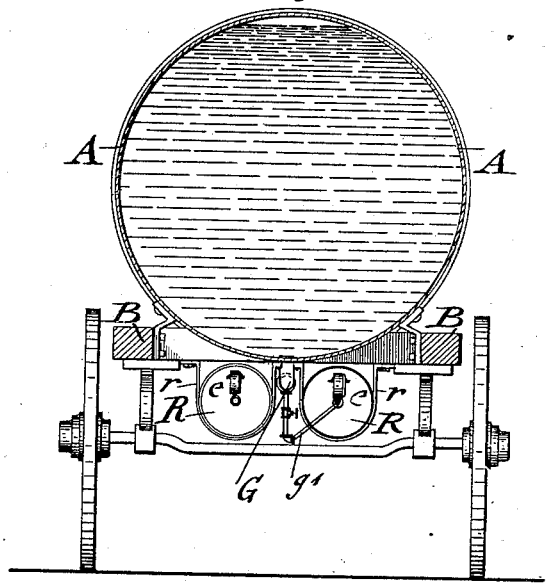
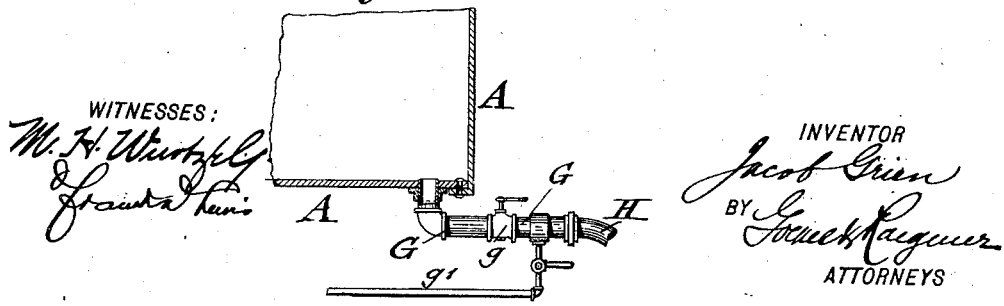
WITNESSES:
INVENTOR
Jacob Grün
BY
ATTORNEYS

UNITED STATES PATENT OFFICE.

JACOB GRÜN, OF NEW YORK, N. Y., ASSIGNOR OF TWO-THIRDS TO JOHN H. BLOCK AND CHRISTIAN FAHLENDER, OF SAME PLACE.

TANK-WAGON FOR DELIVERING FERMENTED LIQUORS.

SPECIFICATION forming part of Letters Patent No. 666,051, dated January 15, 1901.

Application filed April 24, 1900. Serial No. 14,080. (No model.)

*To all whom it may concern:*

Be it known that I, JACOB GRÜN, a citizen of the United States, residing in New York, borough of Manhattan, State of New York, have invented certain new and useful Improvements in Tank-Wagons for Delivering Fermented Liquors, of which the following is a specification.

This invention relates to an improved tank-wagon by which lager-beer and other fermented liquors can be delivered to customers in bulk, so as to dispense with the expense for buying, pitching, and washing delivery-barrels and racking off the fermented liquors into the same; and the invention consists of a tank-wagon for delivering fermented liquors which comprises a wheeled tank, a receiver for carbonic acid below said tank, a pipe connecting said receiver with the dome of the tank-wagon, a valved supply-pipe, also connected with said dome, a discharge-pipe at the bottom of the tank provided with a stop-cock for drawing off the contents of the tank, and a valved pipe connecting the carbonic-acid receiver with the discharge-pipe, as will be fully described hereinafter and finally pointed out in the claim.

In the accompanying drawings, Figure 1 represents a side elevation of my improved tank-wagon for delivering fermented liquors. Fig. 2 is a vertical transverse section on line 2 2, Fig. 1, drawn on a larger scale; and Fig. 3 is a detail section of the discharge-pipe at its point of connection with the bottom of the tank.

Similar letters of reference indicate corresponding parts.

Referring to the drawings, A represents a tank which is preferably made of boiler-iron and of cylindrical or other shape. The tank A is supported on a wheeled frame B and provided at its upper part with a dome A', which has a manhole closed by a manhole-cover $A^2$. The dome A' is connected by a valved supply-pipe C and hose C' with a collecting-tank in the cellar of the brewery when beer or other fermented liquor is to be charged into the tank A. This is preferably accomplished by the pressure of compressed air in the same manner as fermented liquids are transferred in breweries from one cask to the other. On the wheeled frame B are supported, below the tank A, one or two receivers R for liquid carbonic acid by means of straps $r$, which are attached to the frame B, the receivers being slipped into said straps and retained in position thereon. The receivers R are each provided with a pressure-reducing valve $d$ and pressure-gage $e$, as shown in Fig. 1. The outlet-pipe of each receiver R is connected by a valved supply-pipe $f$ with the dome A' of the tank A, so that the fermented liquid after being charged into the tank can be held under a predetermined pressure of carbonic-acid gas, whereby the carbonic acid in the liquid is prevented from escaping while in transit. The tank A is provided at its rear part with an outlet-pipe G, which is connected with the bottom of the tank and provided with a stop-cock $g$ for opening or closing the same. The discharge-pipe G is connected by a valved pipe $g'$ with the discharge-pipe of each receiver R. The discharge-pipe G is further connected by a flexible hose H, which is coupled to the end of the same, with the supply-pipe of a beer-drawing apparatus the tank of which has to be filled with fermented liquid under pressure, said beer-drawing apparatus being located in the basement of the building of the customer. After the beer-drawing apparatus is charged from the tank the hose is uncoupled and placed in suitable position on the wheeled frame of the tank. The tank may be provided with a gage $i$ for indicating the level of the fermented liquid in the same, which may be arranged either on the front or rear head of the tank.

The tank-wagon is preferably provided with two receivers R, which are both connected with the dome of the tank and with the discharge-pipe G, so as to make either receiver available for supplying carbonic-acid gas under pressure to the dome or discharge-pipe. When the tank-wagon arrives at the place of delivery, the discharge-pipe is connected by the flexible hose H with a stand-pipe leading to the beer-drawing apparatus in the basement or cellar of the building. When the connections are properly made, the stop-cock of the discharge-pipe G is opened and the beer forced under pressure of carbonic acid into the tank or tanks in the basement of the building until the same are filled. When this is accomplished, the stop-cock $g$ of the discharge-pipe G is closed and the stop-cock of the connecting-pipe $g'$ opened, so that carbonic-acid gas under pressure is passed through the connecting-hose, and thereby all the beer in the same and in the stand-pipe forced out and an atmosphere of carbonic-acid gas established in the same. After this is accomplished the stand-pipe leading to the beer-drawing apparatus is closed, the stop-cock of the connecting-pipe $g'$ closed, and the hose uncoupled and placed on the wheeled frame of the tank-wagon. The tank-wagon is then taken to the next customer, where the same operation of filling the beer-drawing apparatus is repeated in the same manner, which operation is continued until the entire quantity of liquor in the tank is discharged and delivered. The tank is then filled with carbonic-acid gas, which is discharged after the tank-wagon has been returned to the brewery. The tank is then charged again with a new supply of fermented liquor and sent out again for delivering it. When the tank-wagon gets back to the brewery in the evening, the gas-supply pipe $f$ is first closed. The carbonic-acid gas in the tank is then allowed to escape by opening the manhole-cover, and the tank cleansed by thoroughly washing it with water at the inside and drawing it off through the discharge-pipe G. After the washing is accomplished the manhole-cover is replaced and the tank is ready for being charged again and sent out on its regular route of delivery on the following day.

The delivery-tank A may be inclosed during the summer season by a refrigerating-casing, so that the liquor is delivered at the same or nearly the same temperature which it has in the cellars of the brewery to the tank or tanks of the customer. The tanks may also be arranged in a suitable refrigerator, so that the liquor is kept at the proper temperature during the hot season and can be drawn off for use as soon as charged in the tanks of the delivery apparatus.

Having thus described my invention, what I claim as new, and desire to secure by Letters Patent, is—

A tank-wagon for delivering fermented liquor, consisting of a wheeled frame, a tank supported on the same, said tank being provided with a dome, a receiver for carbonic acid supported on the wheeled frame of the tank, a valved discharge-pipe connected with the bottom of the tank, a gas-supply pipe connecting the receiver with the dome of the tank, a pressure-reducing valve in said gas-supply pipe, and a valved pipe connecting the gas-supply pipe, beyond the pressure-reducing valve, with the discharge-pipe, substantially as set forth.

In testimony that I claim the foregoing as my invention I have signed my name in presence of two subscribing witnesses.

JACOB GRÜN.

Witnesses:
PAUL GOEPEL,
M. H. WURTZEL.